US010326547B2

United States Patent
Yuan et al.

(10) Patent No.: US 10,326,547 B2
(45) Date of Patent: *Jun. 18, 2019

(54) MULTI-USER CODE DIVISION MULTIPLE ACCESS COMMUNICATION METHOD, AND CORRESPONDING TRANSMITTER AND RECEIVER

(71) Applicant: ZTE CORPORATION, Shenzhen, Guangdong Province (CN)

(72) Inventors: Zhifeng Yuan, Shenzhen (CN); Weimin Li, Shenzhen (CN); Xiangyu Liu, Shenzhen (CN); Guanghui Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 121 days.

This patent is subject to a terminal disclaimer.

(21) Appl. No.: 15/513,160

(22) PCT Filed: Jul. 7, 2015

(86) PCT No.: PCT/CN2015/083460
§ 371 (c)(1),
(2) Date: Jul. 11, 2017

(87) PCT Pub. No.: WO2016/045429
PCT Pub. Date: Mar. 31, 2016

(65) Prior Publication Data
US 2017/0359140 A1 Dec. 14, 2017

(30) Foreign Application Priority Data
Sep. 25, 2014 (CN) .......................... 2014 1 0497886

(51) Int. Cl.
H04J 13/10 (2011.01)
H04L 27/26 (2006.01)
H04J 13/00 (2011.01)

(52) U.S. Cl.
CPC .............. *H04J 13/10* (2013.01); *H04L 27/26* (2013.01); *H04J 2013/0037* (2013.01)

(58) Field of Classification Search
None
See application file for complete search history.

(56) References Cited

U.S. PATENT DOCUMENTS 5,790,537 A  8/1998  Yoon et al.
6,359,923 B1 *  3/2002  Agee .................. H04B 1/69
370/342

(Continued)

FOREIGN PATENT DOCUMENTS

CN  1244978 A  2/2000
CN  1287754 A  3/2001

(Continued)

OTHER PUBLICATIONS

Wuyang Zhou, PCN&SS Lad,University of Science and Technology of China et al., M-ary MC-CDMA System for 4G, Hefei, Anhui, China, 2001 IEEE. XP010562366.

(Continued)

*Primary Examiner* — Eunsook Choi
(74) *Attorney, Agent, or Firm* — Ling Wu; Stephen Yang; Ling and Yang Intellectual Property

(57) ABSTRACT

A multi-user code division multiple access communication method, and corresponding transmitter and receiver include: the transmitter determines a complex-valued spreading sequence to be used by the transmitter, herein each element of the complex-valued spreading sequence is a complex number and values of real and imaginary parts of all elements in the complex-valued spreading sequence are from an M-element set of real numbers, and M is an integer larger than or equal to 2; the transmitter performs spreading processing on data symbols to be sent by using the complex-valued spreading sequence to generate a spread symbol (Continued)

sequence; and sends the spread symbol sequence. The receiver receives signals transmitted by multiple transmitters, and performs reception detection by using an interference cancellation signal detector, herein the complex-valued spreading sequences used by the multiple transmitters are used during detection.

16 Claims, 6 Drawing Sheets

(56) References Cited

U.S. PATENT DOCUMENTS

| | | | |
|---|---|---|---|
| 6,707,788 B1 | 3/2004 | Kim et al. | |
| 6,934,317 B1 | 8/2005 | Dent | |
| 2002/0126650 A1 | 9/2002 | Hall et al. | |
| 2006/0256840 A1 | 11/2006 | Alt | |
| 2007/0135051 A1* | 6/2007 | Zheng | H04B 7/18513 455/63.1 |
| 2010/0054131 A1* | 3/2010 | del Rio Herrero | H04B 1/71072 370/236 |
| 2010/0238978 A1 | 9/2010 | Lele et al. | |
| 2011/0126072 A1* | 5/2011 | Yoshimoto | H04J 11/0043 714/751 |
| 2011/0216733 A1 | 9/2011 | Han et al. | |
| 2013/0003785 A1* | 1/2013 | Hahm | H04B 1/7107 375/148 |

FOREIGN PATENT DOCUMENTS

| | | |
|---|---|---|
| CN | 1316142 A | 10/2001 |
| CN | 101471685 A | 7/2009 |
| WO | 199966645 A2 | 12/1999 |
| WO | 200243297 A1 | 5/2002 |
| WO | 2006004550 A2 | 1/2006 |
| WO | 2006022136 A1 | 3/2006 |
| WO | 2013163955 A1 | 11/2013 |

OTHER PUBLICATIONS

Thomas G. Macdonald et al., The Performance of Direct-Sequence Spread Spectrum with Complex Processing and Quaternary Data Modulation, IEEE Journal on Selected Areas in Communications, vol. 18, No. 8, Aug. 2000. XP011450056.

Fanxin Zeng et al., '96-QAM Periodic Complementary Sequence Mates Based on Interleaving Technique and Quadriphase Periodic Complementary Sequence Mates', Journal of Communications and Networks, Dec. 2013, vol. 15, No. 6, pp. 581-588.

* cited by examiner

MULTI-USER CODE DIVISION MULTIPLE ACCESS COMMUNICATION METHOD, AND CORRESPONDING TRANSMITTER AND RECEIVER

TECHNICAL FIELD

The present disclosure relates to the field of wireless communications, and in particular to a multi-user code division multiple access communication method, and corresponding transmitter and receiver.

BACKGROUND

Uplink multi-user access may be performed through different multiple access techniques such as Time Division Multiple Access, TDMA, Frequency Division Multiple Access, FDMA, Code Division Multiple Access, CDMA, and Space Division Multiple Access, SDMA. Herein, the multi-user code division multiple access communication technique is a very important category of uplink multi-user access communication techniques, which can provide excellent access performance and thus has been adopted by multiple wireless communication standards.

In the access process using code division multiple access, first, each access terminal uses a spreading sequence with a certain length (for example, a spreading sequence with a length L means that this spreading sequence consists of L symbols or L elements, and here, L symbols/L elements may be L digital symbols) to perform spreading on digital amplitude-modulated and phase-modulated data symbols. The spreading process refers to the process in which each modulated data symbol is multiplied by each symbol of the spreading sequence, and finally a symbol sequence having the same length as that of the employed spreading sequence is formed. In the spreading process, each modulated data symbol (for example, a constellation point symbol modulated by means of QAM) is multiplied by each symbol of the spreading sequence, and finally each modulated data symbol will be spread into a symbol sequence having the same length as that of the employed spreading sequence. For example, if a spreading sequence of a length L is used, each modulated symbol will be spread into L symbols, in other words, each modulated data symbol is carried on a spreading sequence with the length L. Then, the spread symbol sequences of all access terminals may be sent on the same time-frequency resources. Finally, a base station receives a combined signal on which the spreading signals of all access terminals are superimposed, and available information of each terminal is separated from the combined signal through the multi-user receiver technique.

The communication technique that applies the code division multiple access is generally categorized as spread spectrum communication because a modulation symbol of a terminal will be spread into L-times symbols. If the transmission time of the L-times symbols after spreading is required to be equal to that of the modulation symbols before spreading, the required bandwidth will be necessarily spread L times. This is also why the spreading sequence is generally referred to as the spread spectrum sequence.

If the spread symbol of each terminal is transferred through the multi-carrier technique (such as Orthogonal Frequency Division Multiplexing, OFDM, and Frequency Bank Multi Carrier, FBMC), a combination of the two techniques is referred to as the Multi-Carrier Code Division Multiple Access, MC-CDMA, technique.

In the code division multiple access technique, the spreading process at a transmitting side is relatively simple. It is only required that each modulation symbol such as each QAM-modulated symbol is multiplied by each symbol of a spreading sequence having a length of L such that L spread symbols can be obtained, and then the spread symbols can be transmitted by means of the single-carrier or multi-carrier technique. On the contrary, the receiving process of the base station is not simple.

How to realize a good code division multiple access performance, or more directly, how the base station accurately separate available data information of each terminal from the combined signal is the key of a code division multiple access system. Herein, two main aspects are involved: a spreading sequence and a receiver. Selection of the spreading sequence is a performance basis and design of the receiver is a performance guarantee.

Specifically, to realize a good access performance, good cross-correlation properties are firstly needed for spreading sequences employed by different terminals. If the spreading sequences are directly transferred in a wireless multipath channel, such as a single-carrier code division multiplexing technique, good auto-correlation properties of the sequences are required for combating time-delay multipath spreading of the sequences themselves.

Since the multi-carrier code division multiplexing technique can counter the multipath based on the multi-carrier technique, only the cross-correlation properties that facilitate user information separation needs to be considered for the spreading sequences. This is the most significant difference in the sequence selection between the single-carrier code division multiplexing technique and the multi-carrier code division multiplexing technique.

A good spreading sequence is the basis of the performance, and finally separation of multi-user information is accomplished at a base station side. Corresponding performances will be obtained when the base station employs different multi-user receiving techniques. However, if an optimum multi-user data separation performance is required to be obtained, the base station needs to employ a multi-user receiver technique with high performance and high complexity, such as the serial interference cancellation receiver technique.

Due to the importance of the spreading sequence, the main difference between different code division multiple access techniques lies in the selection of the spreading sequence. The Direct Sequence-Code Division Multiple Access, DS-CDMA, technique is the most common code division multiple access technique, and has been adopted by multiple wireless communication standards as the uplink multiple user access technique, and the spreading sequence thereof is based on the simplest binary Pseudo-Noise, PN, real number sequence. Due to the simplicity of the sequence, DS-CDMA based on the PN sequence is also one of the most common techniques for multi-carrier code division multiplexing. In this technique, each modulated symbol will be firstly spread by a binary pseudo-noise real number sequence and then transmitted by means of the multi-carrier technique.

The binary pseudo-noise real number sequence may also be referred to as a binary-system pseudo-noise sequence in which a value of each symbol is generally represented as 0 or 1, and can also be further represented as a bipolar sequence, that is, 0 is represented as +1 and 1 is represented as −1, or 0 is represented as −1 and 1 is represented as +1.

The length of the spreading sequence is also a key factor of the code division multiple access technique. The longer the spreading sequence is, the easier the low cross-correlation between the spreading sequences employed by various terminals is guaranteed, and the more sequences of low cross-correlation are easily found, and therefore simultaneous access of more terminals is supported. If the number of the simultaneously accessed terminals is larger than the length of the spreading sequence, it can be considered that the multiple user access system is in the overload state. It should be noted that the code division multiple access technique capable of achieving system overload is one of the key attributes shining in the future wireless communications.

To provide a flexible system design and support simultaneous access of more users, generally spreading sequences employed in accessing terminals are not mutually orthogonal, and in terms of multi-user information, non-orthogonal multiple access employed in the uplink can obtain larger system capacity or edge throughput than orthogonal multiple access. Since the spreading sequences of various terminals are not mutually orthogonal, and thus generally the demodulation performance of each user will be degraded as the number of simultaneously accessed users increases. The multi-user interference will become more serious when the system is overloaded. For simple realization, most of the current mainstream code division multiple access techniques use the binary pseudo-noise real number sequence as the spreading sequence. However, since the low cross-correlation between the binary pseudo-noise real number sequences, especially the binary pseudo-noise real number sequences with shorter lengths cannot be easily guaranteed, a serious multi-user interference will be caused and performance of multi-user access will be inevitably influenced.

SUMMARY

Embodiments of the present disclosure provide a multi-user code division multiple access communication method, and corresponding transmitter and receiver that can improve the multi-user code division multiple access performance.

To solve the above-mentioned technical problem, an embodiment of the present disclosure provides a multi-user code division multiple access communication method applied to a transmitter. The method includes:

determining a complex-valued spreading sequence to be used, herein, each element of the complex-valued spreading sequence is a complex number, and values of real and imaginary parts of all elements in the complex-valued spreading sequence are from an M-element set of real numbers, and herein, M is an integer larger than or equal to 2;

performing spreading processing on data symbols to be sent by using the complex-valued spreading sequences, to generate a spread symbol sequence; and sending the spread symbol sequence.

In an exemplary embodiment, herein, the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding energy normalization coefficient; or the M is an even number and the M-element set of real numbers is a set of M real numbers obtained by respectively multiplying M odd numbers ranging from $[-(M-1), (M-1)]$ by a corresponding energy normalization coefficient.

In an exemplary embodiment, herein,

M=2, 3 or 4.

In an exemplary embodiment, herein, determining a complex-valued spreading sequence to be used includes:

generating pseudo-noise first and second real number sequences, herein values of all elements of the first and second real number sequences are from the M-element set of real numbers, and the number of elements contained in the first real number sequence and the number of elements contained in the second real number sequence are equal to L which is the number of the elements of the complex-valued spreading sequence. taking an i-th element of the first real number sequence as a real part, taking an i-th element of the second real number sequence as an imaginary part, and taking a complex number including the real part and the imaginary part as an i-th element of the complex-valued spreading sequence, herein, i=1, 2, . . . , L, and L is an integer larger than or equal to 2.

sequentially combining obtained L elements to obtain the complex-valued spreading sequence, or, sequentially combining L elements after multiplying the obtained L elements by a corresponding energy normalization coefficient to obtain the complex-valued spreading sequence.

In an exemplary embodiment, herein, determining a complex-valued spreading sequence to be used includes:

selecting, according to an appointed rule, a complex-valued sequence from a complex-valued sequence set preset by a transceiving system and determining the complex-valued sequence as the complex-valued spreading sequences; or selecting, according to complex-valued sequence index information sent by a base station, a complex-valued sequence from a complex-valued sequence set preset by a transceiving system and determining the complex-valued sequence as the complex-valued spreading sequence;

herein, in each complex-valued sequence in the complex-valued sequence set, values of real and imaginary parts of all elements are from the M-element set of real numbers.

In an exemplary embodiment, herein, determining a complex-valued spreading sequence to be used includes:

generating a pseudo-noise integer sequence, herein the integer sequence has L elements and values of all elements of the integer sequence are from an M*M-element set of integers, and the M*M-element set of integers is a set of all integers ranging from [0, M*M−1] or [1, M*M], and L is an integer larger than or equal to 2;

selecting, based on the L elements of the pseudo-noise integer sequence, L corresponding complex constellation points from an M*M-point complex constellation map according to a preset mapping rule; and determining L complex numbers corresponding to the L complex constellation points, sequentially combining the L complex numbers to obtain the complex-valued spreading sequence, or, sequentially combining L complex numbers after multiplying the L complex numbers by a corresponding energy normalization coefficient to obtain the complex-valued spreading sequence.

In an exemplary embodiment, herein, sending the spread symbol sequence includes: performing multi-carrier modulation for the spread symbol sequence, generating transmission signals and transmitting the transmission signals.

To solve the above-mentioned technical problem, an embodiment of the present disclosure further provides a multi-user code division multiple access communication method applied to a receiver. The method includes:

receiving signals transmitted by multiple transmitters, herein the signals transmitted by the multiple transmitters are generated by the multiple transmitters using respective complex-valued spreading sequences respectively to perform spreading processing on respective data symbols to be sent and then respectively modulating generated spread symbol sequences onto the same time-frequency resources;

performing reception detection on the received signals transmitted by the multiple transmitters by using an interference cancellation signal detector, herein the complex-valued spreading sequences used by the multiple transmitters are used during detection;

herein, each element of the complex-valued spreading sequences is a complex number and values of real and imaginary parts of all elements in the complex-valued spreading sequences are from an M-element set of real numbers, herein, M is an integer larger than or equal to 2.

In an exemplary embodiment, herein, the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding normalization coefficient; or the M is an even number and the M-element set of real numbers is a set of M real numbers obtained by respectively multiplying M odd numbers ranging from $[-(M-1), (M-1)]$ by a corresponding normalization coefficient.

In an exemplary embodiment, herein,

M=2, 3 or 4.

Correspondingly, the transmitter in the multi-user code division multiple access communication system provided by the embodiment of the present disclosure includes a sequence determining unit, a spreading unit and a signal sending unit.

The sequence determining unit is configured to determine a complex-valued spreading sequence to be used. Herein, each element of the complex-valued spreading sequence is a complex number, and values of real and imaginary parts of all elements in the complex-valued spreading sequence are from an M-element set of real numbers. Herein, M is an integer larger than or equal to 2.

The spreading unit is configured to perform spreading processing on data symbols to be sent by using the complex-valued spreading sequence to generate a spread symbol sequence.

The signal sending unit is configured to send the spread symbol sequence.

In an exemplary embodiment, herein, the values of real and imaginary parts of all elements in the complex-valued spreading sequence determined by the sequence determining unit are from an M-element set of real numbers. Herein:

the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding normalization coefficient; or the M is an even number and the M-element set of real numbers is a set of M real numbers obtained by respectively multiplying M odd numbers ranging from $[-(M-1), (M-1)]$ by a corresponding normalization coefficient.

In an exemplary embodiment, herein, the values of real and imaginary parts of all elements in the complex-valued spreading sequence determined by the sequence determining unit are from an M-element set of real numbers. Herein, M=2, 3 or 4.

In an exemplary embodiment, herein, the operation that the sequence determining unit determines a complex-valued spreading sequence to be used includes:

generating pseudo-noise first and second real number sequences, herein values of all elements of the first and second real number sequences are from the M-element set of real numbers, and the number of elements contained in the first real number sequence and the number of elements contained in the second real number sequences are equal to L which is the number of the elements of the complex-valued spreading sequence;

taking an i-th element of the first real number sequence as a real part, taking an i-th element of the second real number sequence as an imaginary part, and taking a complex number including the real part and the imaginary part as an i-th element of the complex-valued spreading sequence, herein, i=1, 2, . . . , L, and L is an integer larger than or equal to 2;

Sequentially combining obtained L elements to obtain the complex-valued spreading sequence, or, sequentially combining L elements after multiplying the obtained L elements by a corresponding energy normalization coefficient to obtain the complex-valued spreading sequence.

In an exemplary embodiment, herein, the operation that the sequence determining unit determines a complex-valued spreading sequence to be used includes:

selecting, according to an appointed rule, a complex-valued sequence from a complex-valued sequence set preset by a transceiving system and determining the complex-valued sequence as the complex-valued spreading sequences; or selecting, according to complex-valued sequence index information sent by a base station, a complex-valued sequence from a complex-valued sequence set preset by a transceiving system and determining the complex-valued sequence as the complex-valued spreading sequence;

Herein, in each complex-valued sequence in the complex-valued sequence set, values of real and imaginary parts of all elements are from the M-element set of real numbers.

In an exemplary embodiment, herein, the operation that the sequence determining unit determines a complex-valued spreading sequence to be used includes:

generating a pseudo-noise integer sequence, herein the integer sequence has L elements and values of all elements of the integer sequence are from an M*M-element set of integers, and the M*M-element set of integers is a set of all integers ranging from [0, M*M-1] or [1, M*M], and L is an integer larger than or equal to 2;

selecting, based on the L elements of the pseudo-noise integer sequence, L corresponding complex constellation points from an M*M-point complex constellation map according to a preset mapping rule; and determining L complex numbers corresponding to the L complex constellation points, sequentially combining the L complex numbers to obtain the complex-valued spreading sequence, or, sequentially combining L complex numbers after multiplying the L complex numbers by a corresponding energy normalization coefficient to obtain the complex-valued spreading sequence.

In an exemplary embodiment, herein, the operation that the signal sending unit sends the spread symbol sequence includes performing multi-carrier modulation for the spread symbol sequence, generating transmission signals and transmitting the transmission signals.

Correspondingly, the receiver in the multi-user code division multiple access communication system provided by an embodiment of the present disclosure includes a signal receiving unit and a reception detecting unit.

The signal receiving unit is configured to receive signals transmitted by multiple transmitters, herein the signals transmitted by the multiple transmitters are generated by the multiple transmitters using respective complex-valued spreading sequences respectively to perform spreading processing on respective data symbols to be sent and then respectively modulating generated spread symbol sequences onto the same time-frequency resources.

The reception detecting unit is configured to perform reception detection on the received signals transmitted by the multiple transmitters by using an interference cancellation signal detector. Herein, the complex-valued spreading sequences used by the multiple transmitters are used during detection.

Herein, each element of the complex-valued spreading sequences is a complex number and values of real and imaginary parts of all elements in the complex-valued spreading sequences are from an M-element set of real numbers. Herein, M is an integer larger than or equal to 2.

In an exemplary embodiment, herein, in the complex-valued spreading sequences, used by the multiple transmitters, which are used during detection by the reception detecting unit, the values of real and imaginary parts of all elements are from an M-element set of real numbers. Herein:

the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding normalization coefficient; or the M is an even number and the M-element set of real numbers is a set of M real numbers obtained by respectively multiplying M odd numbers ranging from $[-(M-1), (M-1)]$ by a corresponding normalization coefficient.

In an exemplary embodiment, herein, in the complex-valued spreading sequences, used by the multiple transmitters, which are used during detection by the reception detecting unit, the values of real and imaginary parts of all elements are from an M-element set of real numbers. Herein M=2, 3 or 4.

In the multi-user code division multiple access communication solution provided in the above-mentioned scheme, by using the complex-valued spreading sequences to perform spreading on the data symbols, a set of sequences having low cross-correlation is easily selected in comparison with the binary real number sequence, which can obtain a better code division multiple access performance, improve the system's overload capacity and improve the user's communication experience of non-orthogonal overload access.

DETAILED DESCRIPTION

Hereinafter, embodiments of the present disclosure will be described in detail in conjunction with the accompanying drawings. It needs to be noted that the embodiments of the present application and the features in the embodiments can be combined with each other without conflict.

Embodiment One

Figure 1:
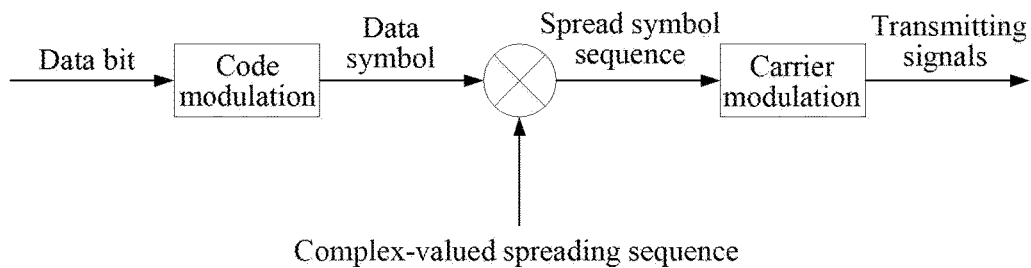
FIG. 1 is a schematic diagram of a signal processing of a transmitter according to embodiment one of the present disclosure.

The embodiment provides a multi-user code division multiple access communication method, and corresponding transmitter and receiver. The procedure of the signal processing performed by the transmitter (such as a terminal in a transceiving system, which may also be referred to as a terminal transmitter) is shown in FIG. 1. Herein, data bits to be sent are firstly coded and modulated to obtain data symbols, and the data symbols are spread through a complex-valued spreading sequence to obtain a spread symbol sequence and then carrier modulation is performed for the spread symbol sequence to generate transmitting signals for transmission.

Figure 2:
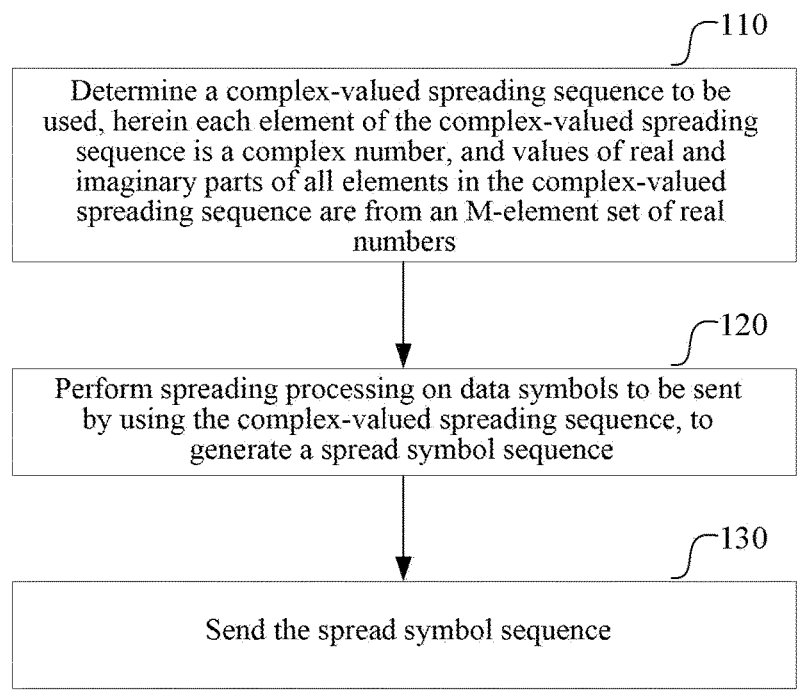
FIG. 2 is a flow chart of a multi-user code division multiple access communication method at a transmitter side according to embodiment one of the present disclosure.

The flow chart of a multi-user code division multiple access communication method at a transmitter side in the embodiment is shown in FIG. 2, which includes the following steps 100-130.

In step 110, a complex-valued spreading sequence to be used is determined; herein, each element of the complex-valued spreading sequence is a complex number, and values of real and imaginary parts of all elements of the complex-valued spreading sequence are from an M-element set of real numbers; and herein, M is an integer larger than or equal to 2.

The M-element set of real numbers is a set of M real numbers. In an exemplary embodiment, the M-element set of real numbers is one of the following sets.

The M is an odd number and the M-element set of real numbers is a set of M integers ranging from $[-(M-1)/2, (M-1)/2]$.

Or, the M is an even number and the M-element set of real numbers is a set of M odd numbers ranging from $[-(M-1), (M-1)]$.

Or, the M is an odd number and the M-element set of real numbers is a set of M real numbers obtained by respectively multiplying M integers ranging from $[-(M-1)/2, (M-1)/2]$ by a corresponding normalization coefficient.

Or, the M is an even number and the M-element set of real numbers is a set of M real numbers obtained by respectively multiplying M odd numbers ranging from $[-(M-1), (M-1)]$ by a corresponding normalization coefficient.

In step 120, the complex-valued spreading sequence is employed to perform spreading processing on data symbols to be sent to generate a spread symbol sequence.

The spreading processing in the step refers to that a complex multiplication is carried out between each code-modulated data symbol and each element (a complex symbol) of the complex-valued spreading sequence, and finally a complex symbol sequence having the same length as that of the employed spreading sequence is generated.

In step 130, the spread symbol sequence is sent.

In this step, in an exemplary embodiment, multi-carrier modulation is performed for the spread symbol sequence, and transmission signals are generated and transmitted.

In one example, the step of determining a complex-valued spreading sequence to be used in the above step 110 includes the following operations.

Pseudo-noise first and second real number sequences are generated. Herein, values of all elements of the first and second real number sequences are from the M-element set of real numbers, and the number of the elements contained in the first real number sequence and the number of elements contained in the second real number sequences are equal to L which is the number of the elements of the complex-valued spreading sequence.

An i-th element of the first real number sequence is taken as a real part, and an i-th element of the second real number sequence is taken as an imaginary part, and a complex number including the real part and the imaginary part is taken as an i-th element of the complex-valued spreading sequence. Herein, i=1, 2, ..., L, and L is an integer larger than or equal to 2.

Obtained L elements are sequentially combined to obtain the complex-valued spreading sequence, or, L elements after multiplying the obtained L elements by a corresponding energy normalization coefficient are sequentially combined to obtain the complex-valued spreading sequence.

In another example, the step of determining a complex-valued spreading sequence to be used in the above step 110 includes the following operations.

A complex-valued sequence is selected from a preset complex-valued sequence set of a transceiving system according to an appointed rule, and the complex-valued sequence is determined as the complex-valued spreading sequence.

Or, a complex-valued sequence is selected from a preset complex-valued sequence set of a transceiving system according to complex-valued sequence index information sent by a base station, and the complex-valued sequence is determined as the complex-valued spreading sequence.

Herein, in each complex-valued sequence in the complex-valued sequence set, values of real and imaginary parts of all elements are from the M-element set of real numbers.

In still another example, the step of determining a complex-valued spreading sequence to be used in the above step 110 includes the following operations.

A pseudo-noise integer sequence is generated. Herein, the integer sequence has L elements and values of all elements of the integer sequence are from an M*M-element set of integers, and the M*M-element set of integers is a set of all integers ranging from $[0, M*M-1]$ or $[1, M*M]$, and L is an integer larger than or equal to 2.

L corresponding complex constellation points are selected from an M*M-point complex constellation map based on the L elements of the pseudo-noise integer sequence and according to a preset mapping rule.

L complex numbers corresponding to the L complex constellation points are determined, and the L complex numbers are sequentially combined to obtain the complex-valued spreading sequence, or, L complex numbers after multiplying the L complex numbers by a corresponding energy normalization coefficient are sequentially combined to obtain the complex-valued spreading sequence.

Figure 3:
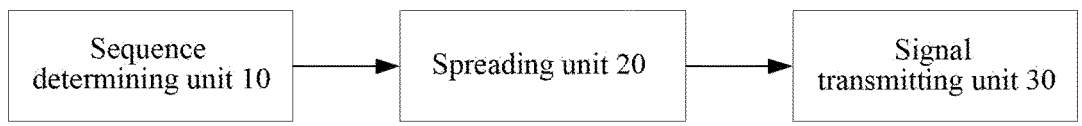
FIG. 3 is a module diagram of a transmitter according to embodiment one of the present disclosure.

Correspondingly, the transmitter in the multi-user code division multiple access communication system in the embodiment is shown in FIG. 3, which includes a processor and a program storage device, and further includes a sequence determining unit 10, a spreading unit 20 and a signal sending unit 30.

The sequence determining unit 10 is configured to determining a complex-valued spreading sequence to be used. Herein, each element of the complex-valued spreading sequence is a complex number and values of real and imaginary parts of all elements of the complex-valued spreading sequence are from an M-element set of real numbers, Herein, M is an integer larger than or equal to 2.

The spreading unit 20 is configured to employ the complex-valued spreading sequence to performing spreading processing on data symbols to be sent to generate a spread symbol sequence.

The signal sending unit 30 is configured to send the spread symbol sequence. In an exemplary embodiment, multi-carrier modulation is performed for the spread symbol sequence, and transmission signals are generated and transmitted.

In an exemplary embodiment, values of real and imaginary parts of all elements of the complex-valued spreading sequence determined by the sequence determining unit 10 are from an M-element set of real numbers. Herein:

The M is an odd number and the M-element set of real numbers is a set of M integers ranging from [−(M−1)/2, (M−1)/2].

Or, the M is an even number and the M-element set of real numbers is a set of M odd numbers ranging from [−(M−1), (M−1)].

Or, the M is an odd number and the M-element set of real numbers is a set of M real numbers obtained by respectively multiplying M integers ranging from [−(M−1)/2, (M−1)/2] by a corresponding normalization coefficient.

Or, the M is an even number and the M-element set of real numbers is a set of M real numbers obtained by respectively multiplying M odd numbers ranging from [−(M−1), (M−1)] by a corresponding normalization coefficient.

In one example, the sequence determining unit determining a complex-valued spreading sequence to be used includes the following operations.

Pseudo-noise first and second real number sequences are generated. Herein, values of all elements of the first and second real number sequences are from the M-element set of real numbers, and the number of the elements contained in the first real number sequence and the number of the elements contained in the second real number sequence are equal to L which is the number of the elements of the complex-valued spreading sequence.

An i-th element of the first real number sequence is taken as a real part, and an i-th element of the second real number sequence is taken as an imaginary part, and a complex number including the real part and the imaginary part is taken as an i-th element of the complex-valued spreading sequence. Herein, i=1, 2, . . . , L, L is an integer larger than or equal to 2.

The obtained L elements are sequentially combined to obtain the complex-valued spreading sequence, or, L elements after multiplying the obtained L elements by a corresponding energy normalization coefficient are sequentially combined to obtain the complex-valued spreading sequence.

In another example, the sequence determining unit determining a complex-valued spreading sequence to be used includes the following operations.

According to an appointed rule, a complex-valued sequence is selected from a preset complex-valued sequence set of a transceiving system and the complex-valued sequence is determined as the complex-valued spreading sequence.

According to complex-valued sequence index information sent by a base station, a complex-valued sequence is selected from a preset complex-valued sequence set of a transceiving system and the complex-valued sequence is determined as the complex-valued spreading sequence.

Herein, in each complex-valued sequence in the complex-valued sequence set, values of real and imaginary parts of all elements are from the M-element set of real numbers.

In still another example, the sequence determining unit determining a complex-valued spreading sequence to be used includes the following operations.

A pseudo-noise integer sequence is generated. Herein, the integer sequence has L elements and values of all elements of the integer sequence are from an M*M-element set of integers. The M*M-element set of integers is a set of all integers ranging from [0, M*M−1] or [1, M*M], and L is an integer larger than or equal to 2.

Based on the L elements of the pseudo-noise integer sequence, L corresponding complex constellation points are selected from an M*M-point complex constellation map according to a preset mapping rule.

L complex numbers corresponding to the L complex constellation points are determined. Then, the L complex numbers are sequentially combined to obtain the complex-valued spreading sequence, or, L complex numbers after multiplying the L complex numbers by a corresponding energy normalization coefficient are sequentially combined to obtain the complex-valued spreading sequence.

In particular, in exemplary embodiments in the embodiments, as an example in which M is an odd number, M=3; and as an example in which M is an even number, M=4. Since in a case where M=2, values of real and imaginary parts of all elements of the complex-valued spreading sequence are from a set of binary real numbers, that is, the values are 0, 1 or −1, 1. At this time, when the length (i.e., the number of elements) of the complex-valued spreading sequence is relatively small, the number of complex-valued spreading sequences that may be generated is not large, the improvement of the system's overload capacity is limited and the size of a complex-valued spreading sequence set with low cross-correlation may be further reduced. While in the case that M=3 or 4, even if the length of the spreading sequence is small, a set of complex-valued spreading sequences having enough low cross-correlation may be selected, and there are enough complex-valued spreading sequences for terminals to use, such that the system's overload capacity is further improved and the user's communication experience of non-orthogonal overload access is enhanced.

In the above-mentioned solution, the transmitter employs a particular complex-valued sequence as a spreading sequence to perform spreading processing on data symbols to be sent and for the receiver to identify signals transmitted by the transmitter. When multiple transmitters simultaneously send information to the receiver through the same time-frequency resources, each transmitter employs respective complex-valued spreading sequences respectively to perform spreading processing on respective data symbols to be sent, such that the receiver may identify signals transmitted by different transmitters. Since the complex-valued sequence (i.e., each element in the sequence is a complex number) may have a higher freedom of design than a binary real number sequence and it is easier to select a set of sequences having low cross-correlation as a spreading sequence set of code division multiple access, a better code division multiple access performance can be obtained, and thereby a higher system overload level is supported and the user's communication experience of non-orthogonal overload access is improved.

Embodiment Two

Figure 4:
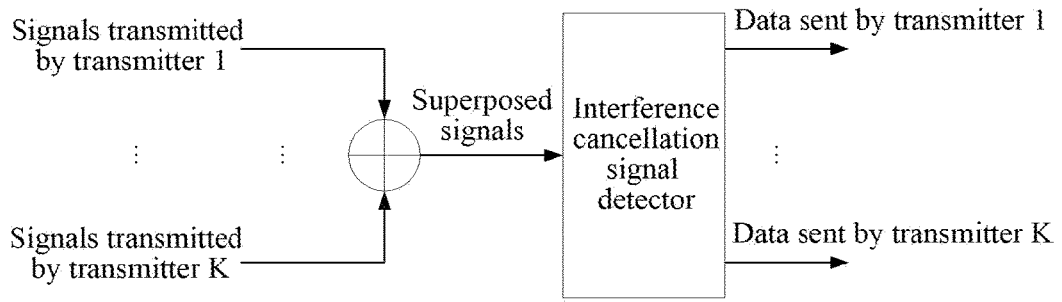
FIG. 4 is a schematic diagram of signal receiving and processing of a receiver according to embodiment two of the present disclosure.

The embodiment relates to a multi-user code division multiple access communication method at a receiver side and a corresponding receiver. The principle of signal receiving and processing by the receiver (such as a base station in a transceiving system) is shown in FIG. 4. In FIG. 4, signals transmitted by L transmitters (processing during signal transmission by each transmitter is shown in FIG. 1) are propagated over-the-air radio, and after the radio propagation, the receiver receives a superposed signal of the signals transmitted by L transmitters, and an interference cancellation signal detector performs reception detection on the superposed signal to obtain data transmitted by each transmitter. In an exemplary embodiment, the interference cancellation signal detector is a Successive Interference Cancellation, SIC, signal detector.

Figure 5:
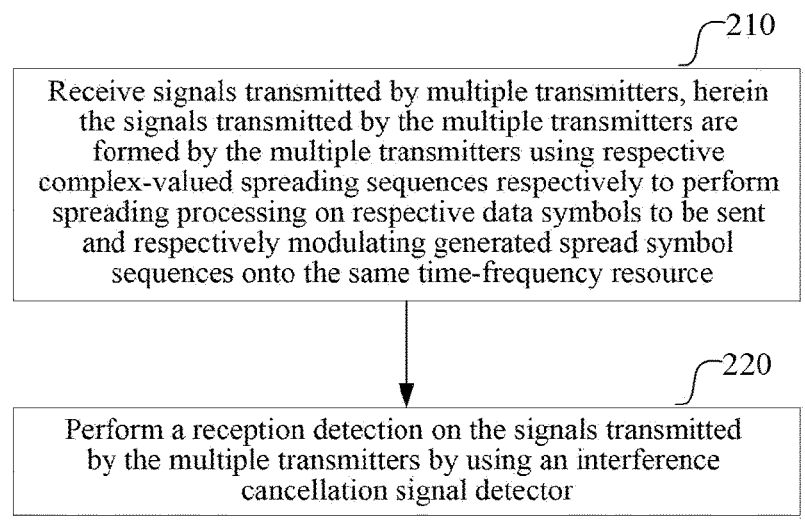
FIG. 5 is a flow chart of a multi-user code division multiple access communication method at a receiver side according to embodiment two of the present disclosure.
Figure 6:
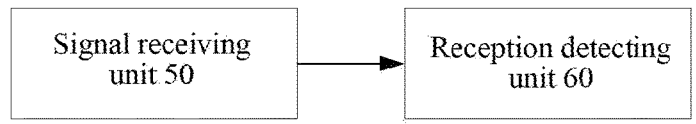
FIG. 6 is a module diagram of a receiver according to embodiment two of the present disclosure.

FIG. 5 shows a flow chart of a multi-user code division multiple access communication method at a receiver side. The method includes the following steps 210-220.

In step 210, signals transmitted by multiple transmitters are received. Herein, the signals transmitted by the multiple transmitters are generated by the multiple transmitters using respective complex-valued spreading sequences respectively to perform spreading processing on respective data symbols to be sent and respectively modulating generated spread symbol sequences onto the same time-frequency resources.

In this step, each element of the complex-valued spreading sequences is a complex number and values of real and imaginary parts of all elements of the complex-valued spreading sequences are from an M-element set of real numbers. Herein, M is an integer larger than or equal to 2.

In step 220, the reception detection of the signals transmitted by the multiple transmitters is performed by using an interference cancellation signal detector. Herein, the complex-valued spreading sequences employed by the multiple transmitters are used during detection.

A specific reception detection method is not limited in the present disclosure. However, during detection, the receiver needs to use the complex-valued spreading sequences employed by the multiple transmitters to identify the signals transmitted by each terminal. The receiver may determine a complex-valued spreading sequence used by the transmitter according to a sequence index provided by the transmitter, and may use more complex-valued spreading sequences during blind detection.

In an exemplary embodiment, the M-element set of real numbers may be one of the following sets.

The M is an odd number and the M-element set of real numbers is a set of M integers ranging from [−(M−1)/2, (M−1)/2].

Or, the M is an even number and the M-element set of real numbers is a set of M odd numbers ranging from [−(M−1), (M−1)].

Or, the M is an odd number and the M-element set of real numbers is a set of M real numbers obtained by respectively multiplying M integers ranging from [−(M−1)/2, (M−1)/2] by a corresponding normalization coefficient.

Or, the M is an even number and the M-element set of real numbers is a set of M real numbers obtained by respectively multiplying M odd numbers ranging from [−(M−1), (M−1)] by a corresponding normalization coefficient.

In an exemplary embodiment, M=3 or 4.

Correspondingly, the receiver in the multi-user code division multiple access communication system in the embodiment is shown in FIG. 5. The receiver includes a processor and a program storage device, and further includes a signal receiving unit 50 and a reception detecting unit 60.

The signal receiving unit 50 is configured to receiving signals transmitted by multiple transmitters. Herein, the signals transmitted by the multiple transmitters are generated by the multiple transmitters using respective complex-valued spreading sequences respectively to perform spreading processing on respective data symbols to be sent and respectively modulating generated spread symbol sequences onto the same time-frequency resources.

The reception detecting unit 60 is configured to perform the reception detection on the signals transmitted by the multiple transmitters using an interference cancellation signal detector. Herein, the complex-valued spreading sequences employed by the multiple transmitters are used during detection.

Herein, each element of the complex-valued spreading sequences is a complex number, and values of real and imaginary parts of all elements of the complex-valued spreading sequences are from an M-element set of real numbers. Herein, M is an integer larger than or equal to 2.

In an exemplary embodiment,
the M is an odd number and the M-element set of real numbers is a set of M integers ranging from [−(M−1)/2, (M−1)/2]; or
the M is an even number and the M-element set of real numbers is a set of M odd numbers ranging from [−(M−1), (M−1)]; or
the M is an odd number and the M-element set of real numbers is a set of M real numbers obtained by respectively multiplying M integers ranging from [−(M−1)/2, (M−1)/2] by a corresponding normalization coefficient; or
the M is an even number and the M-element set of real numbers is a set of M real numbers obtained by respectively multiplying M odd numbers ranging from [−(M−1), (M−1)] by a corresponding normalization coefficient.

In an exemplary embodiment, M=3 or 4.

The above-mentioned solutions (the multi-user code division multiple access communication methods at the transmitter side and the receiver side and corresponding transmitter and receiver) of the embodiment one and embodiment two, during specific applications, may be applied to an MC-CDMA system, and may be applied to a contention access scenario, a scheduling-free (or grant-free) access scenario and the like.

During applied to the MC-CDMA system, the transmitter employs the above-mentioned particular complex-valued spreading sequence to perform spreading processing on the data symbols to be sent to obtain a spread symbol sequence, and then transmitting the spread symbol sequence to the receiver. Herein, multiple transmitters may use the same frequency-domain bandwidth or subcarrier resources. Correspondingly, after the receiver receives the signals transmitted by multiple transmitters, the interference cancellation signal detector is used to perform reception detection on the signals transmitted by multiple transmitters, which can efficiently distinguish multiple terminals that use the same time-frequency resources, and thereby the system capacity is efficiently increased. Consequently, more access terminals are loaded at a certain transfer rate, and a higher system overload level is supported and the user's communication experience of non-orthogonal overload access is improved.

During applied to the contention access scenario, multiple or even a large number of user terminals will simultaneously request access to the system, and each terminal transmitter respectively employs the above-mentioned particular complex-valued spreading sequence to perform spreading processing on the data symbols to be sent, and then, the receiver employs the interference cancellation signal detector to perform reception detection on the signals transmitted by each terminal receiver, which can efficiently distinguish the signals transmitted by each terminal, and thereby supporting a higher system overload level, efficiently improving the system access efficiency and improving the terminal access experience.

During applied to the scheduling-free (or grant-free) access scenario, data transmission may be carried out on available time-frequency resources when the user terminal needs to send data, and there is a situation that multiple user terminals simultaneously use the same time-frequency resources to perform data transmission. Each terminal transmitter respectively employs the above-mentioned particular complex-valued spreading sequence to perform spreading processing on the data symbols to be sent, and the receiver employs the interference cancellation signal detector to perform reception detection on the signals transmitted by each terminal receiver, which can efficiently distinguish the signals transmitted by each terminal, and thereby supporting a higher system overload level, improving the communication experiences of user terminal scheduling-free access, and can also decrease system scheduling signaling and reduce the terminal access delay.

Embodiment Three

The embodiment provides a method for generating a complex-valued spreading sequence. Herein, a transmitter generates a complex-valued spreading sequence according to two pseudo-noise real number sequences. Values of all elements of the two pseudo-noise real number sequences are from the M-element set of real numbers as described in the embodiment one and embodiment two. The length of the two pseudo-noise real number sequences is the same as the length of the complex-valued spreading sequence.

Figure 7:
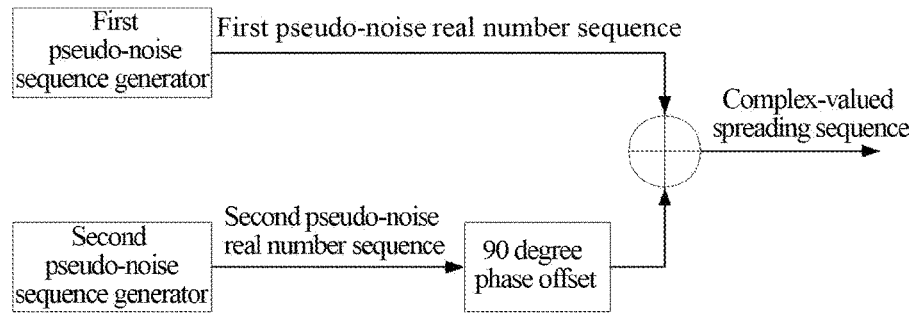
FIG. 7 is a principle schematic diagram of an example about generation of a complex-valued spreading sequence in embodiment three of the present disclosure.

In the embodiment, the two pseudo-noise real number sequences are independently generated by two pseudo-noise sequence generators in the transmitter, respectively. As shown in FIG. 7, the first pseudo-noise sequence generator generates a first pseudo-noise real number sequence having the same length as that of the complex-valued spreading sequence, and the second pseudo-noise sequence generator generates a second pseudo-noise real number sequence having the same length as that of the complex-valued spreading sequence.

Figure 8:
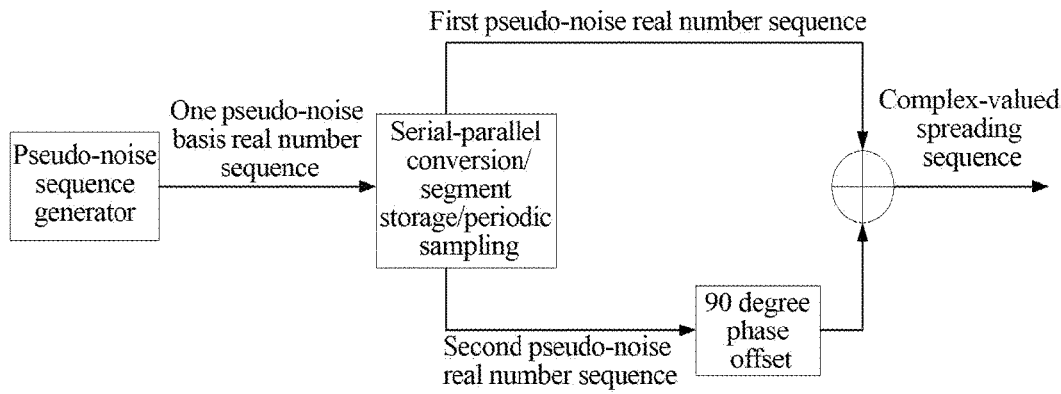
FIG. 8 is a principle schematic diagram of another example about generation of a complex-valued spreading sequence in embodiment three of the present disclosure.

In another embodiment, as shown in FIG. 8, a pseudo-noise basis real number sequence is firstly generated by a pseudo-noise sequence generator in the transmitter, and herein, values of all elements of the basis real number sequence are from the M-element set of real numbers as described in embodiment one and embodiment two; and then serial-parallel conversion or segment storage or periodic sampling is performed on the pseudo-noise basis real number sequence, to form the first pseudo-noise real number sequence and second pseudo-noise real number sequence that have the same length as that of the complex-valued spreading sequence.

Herein, if the serial-parallel conversion is employed, it is assumed that the length of the pseudo-noise basis real number sequence is as two times as the length of the complex-valued spreading sequence, and an initial value of element indexes of the basis real number sequence is set to 0, which is equivalent to that elements at even positions of the basis real number sequence form the first pseudo-noise real number sequence and elements at odd positions of the basis real number sequence form the second pseudo-noise real number sequence.

If the segment storage mode is employed, it is assumed that the length of the pseudo-noise basis real number sequence is as two times as the length of the complex-valued spreading sequence, then a front half of the elements of the basis real number sequence may be stored as the first pseudo-noise real number sequence and a rear half of the elements of the basis real number sequence may be stored as the second pseudo-noise real number sequence.

If the periodic sampling mode is employed, it is assumed that the length of the pseudo-noise basis real number sequence is as multiple times as the length of the complex-valued spreading sequence, then elements at a portion of positions may be periodically extracted from the basis real number sequence as the first pseudo-noise real number sequence, and similarly, elements at another portion of positions are periodically extracted as the second pseudo-noise real number sequence.

In the embodiment, as shown in FIG. 7 and FIG. 8, each element of the second pseudo-noise real number sequence, after performing 90 degree phase offset (or multiplication by $e^{j\pi/2}$), is added with each element of the first pseudo-noise real number sequence bit by bit to generate a complex-valued spreading sequence, which is represented as follows:

ComplexSeq=Seq1+Seq2*$e^{j\pi/2}$

Herein, ComplexSeq represents the complex-valued spreading sequence, and Seq1 represents the first pseudo-noise real number sequence, and Seq2 represents the second pseudo-noise real number sequence. Performing 90 degree phase offset (or multiplication by $e^{j\pi/2}$) on each element of Seq2 is equivalent to taking Seq2 as an imaginary part of ComplexSeq. It should be noted that the addition in the above equation refers to bit-by-bit addition, that is, the i-th element of Seq1 is taken as a real part, the i-th element of Seq2 is taken as an imaginary part and a complex number including the real part and the imaginary part is taken as the i-th element of ComplexSeq. Herein, i=1, 2, . . . , L.

Taking M=3 as an example, that is, values of all elements of the pseudo-noise first and second real number sequences are from a three-element set of real numbers {1, 0, −1}. It is assumed that the second pseudo-noise real number sequence is "1, −1, 0, −1, 1, 0, −1, 1", 90 degree phase offset is performed on each element of the second pseudo-noise real number sequence, which is equivalent to multiplication by $e^{j\pi/2}$, to obtain "$e^{j\pi/2}$, $-e^{j\pi/2}$, 0, $-e^{j\pi/2}$, $e^{j\pi/2}$, 0, $-e^{j\pi/2}$, $e^{j\pi/2}$". It is assumed that the first pseudo-noise real number sequence is "−1, 0, 1, 1, −1, 1, −1, 0", a complex-valued sequence obtained by bit-by-bit addition of the second pseudo-noise real number sequence after 90 degree phase offset and he first pseudo-noise real number sequence is "$-1+e^{j\pi/2}$, $-e^{j\pi/2}$, 1, $1-e^{j\pi/2}$, $-1+e^{j\pi/2}$, 1, $-1-e^{j\pi/2}$, $e^{j\pi/2}$". The complex-valued sequence may also be represented as "−1+j, −j, 1, 1−j, −1+j, 1, −1−j, j". This complex-valued sequence may be used as the complex-valued spreading sequence. Moreover, energy normalization may also be further performed on the generated complex-valued sequence, that is, each complex number in the complex-valued sequence is multiplied by a corresponding energy normalization coefficient, and then the obtained complex-valued sequence is further used as the complex-valued spreading sequence. The energy normalization coefficient corresponding to the complex-valued sequence may employ the reciprocal of the sum of energies of each element of the complex-valued sequence. For example, if the sum of energies of the complex-valued sequence "−1+j, −j, 1, 1−j, −1+j, 1, −1−j, j" is 2+1+1+2+1+2+1=12, the complex-valued sequence after energy normalization is "(−1+j)/sqrt(12), −j/sqrt(12), 1/sqrt(12), (1−j)/sqrt(12), (−1+j)/sqrt(12), 1/sqrt(12), (−1−j)/sqrt(12), j/sqrt(12)". Herein, sqrt( ) represents a square-root operation.

Other values between 0 and $2\pi$ may also be used for the above-mentioned phase offset, such as 270 degrees, (or $3\pi/2$), −90 degrees (or $-\pi/2$), −270 degrees (or $-3\pi/2$) and the like.

Figure 9:
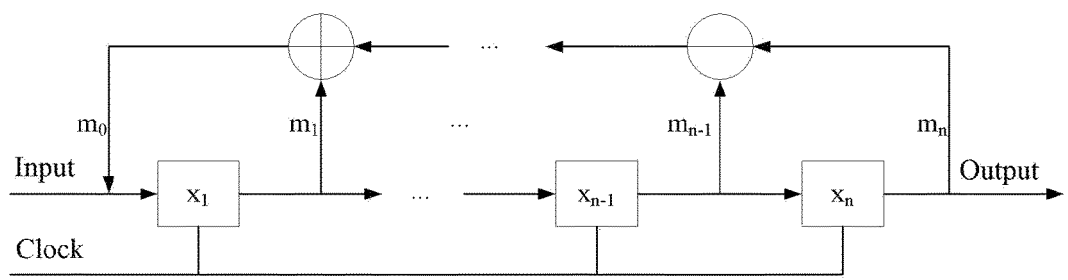
FIG. 9 is a principle schematic diagram of an M-element pseudo-noise sequence generator in embodiment three of the present disclosure.

The above-mentioned pseudo-noise sequence generator may be formed by a linear feedback shift register. As shown in FIG. 9, it is assumed that the pseudo-noise sequence generator is formed by an n stage linear feedback shift register, and is used for generating a pseudo-noise real number sequence having a length of $M^n-1$. A feedback function or feedback connection polynomial may be represented as $f=m_0x_0+m_1x_1+\ldots+m_{n-1}x_{n-1}+m_nx_n$. Herein, $m_0$, $m_{01}, \ldots, m_{n-1}, m_n$ are feedback coefficients. A clock is used to control shift registration operation. For two pseudo-noise sequence generators in FIG. 7, different feedback functions or feedback connection polynomials are employed.

Embodiment Four

The embodiment provides another method for generating a complex-valued spreading sequence. The principle schematic diagram of the method is shown in FIG. 10 or FIG. 11.

A transmitter generates a complex-valued spreading sequence according to two pseudo-noise real number sequences, and the length of the two pseudo-noise real number sequences is the same as the length of the complex-valued spreading sequence. The process of generating the two pseudo-noise real number sequences is described in embodiment three.

Figure 10:
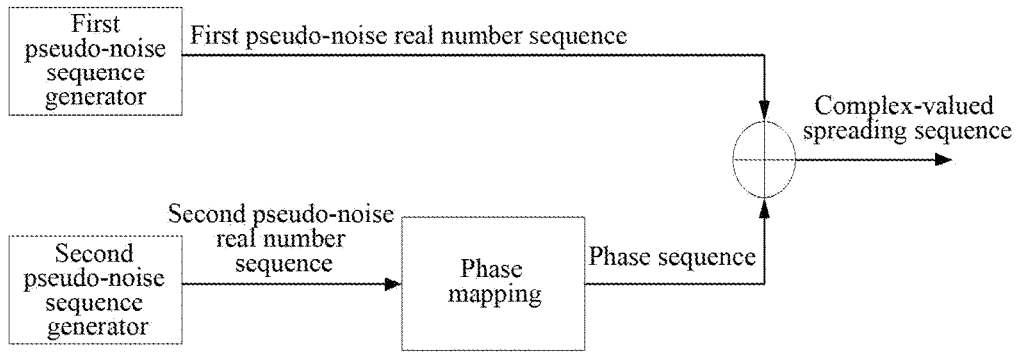
FIG. 10 is a principle schematic diagram of an example about generation of a complex-valued spreading sequence in embodiment four of the present disclosure.
Figure 11:
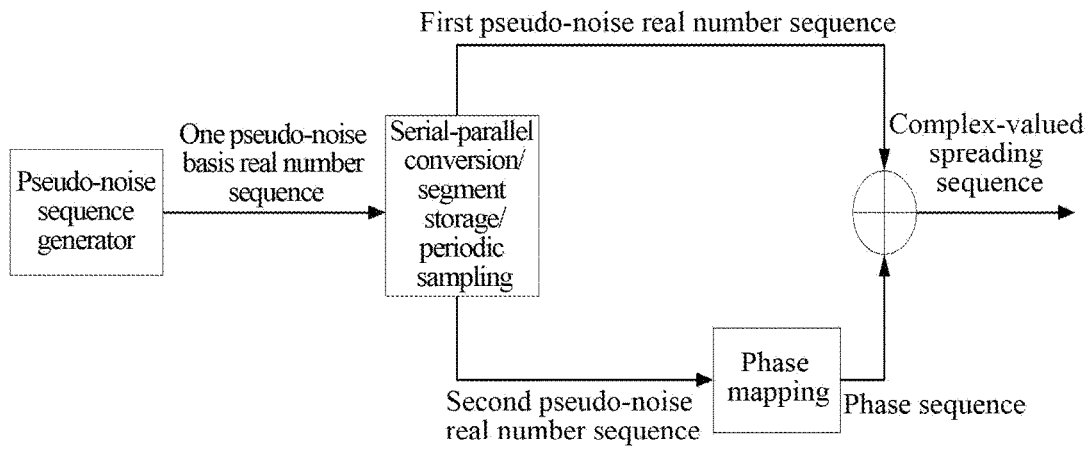
FIG. 11 is a principle schematic diagram of another example about generation of a complex-valued spreading sequence in embodiment four of the present disclosure.

In the embodiment, as shown in FIG. 10 and FIG. 11, phase mapping is performed on the second pseudo-noise real number sequence according to a mapping relationship between the pseudo-noise real number sequence and a phase set to obtain a phase sequence, and then the first pseudo-noise real number sequence is added with the phase sequence bit by bit to generate a complex-valued spreading sequence, which is represented by the following equation:

ComplexSeq=Seq1+SeqPhase

Herein, ComplexSeq represents the complex-valued spreading sequence, and Seq1 represents the M-element pseudo-noise sequence one, and SeqPhase represents a phase sequence mapped by the M-element pseudo-noise real number sequence two. Similarly, the addition in the above equation also refers to bit-by-bit addition, that is, the i-th element of Seq1 is taken as a real part, and the i-th element of SeqPhase is taken as an imaginary part and a complex number including the real part and the imaginary part is taken as the i-th element of ComplexSeq. Herein, i=1, 2, . . . , L.

Taking M=3 as an example, that is, values of all elements of the pseudo-noise first and second real number sequences are from a three-element set of real numbers {1, 0, −1}. It is predefined that the phase set includes a 90 degree phase (or $e^{j\pi/2}$), 0 degree phase and a −90 degree phase (or $-e^{j\pi/2}$), and it is predefined that value "1" of a sequence element is mapped to a 90 degree phase (or $e^{j\pi/2}$), value "0" of a sequence element is mapped to a 0 degree phase and value "−1" of a sequence element is mapped to a −90 degree phase (or $e^{-j\pi/2}$). In this embodiment, it is assumed that the second pseudo-noise real number sequence is "1, −1, 0, −1, 1, 0, −1, 1", and according to the above mapping relationship, the second pseudo-noise real number sequence is mapped to a phase sequence "$e^{j\pi/2}, -e^{j\pi/2}, 0, -e^{j\pi/2}, e^{j\pi/2}, 0, -e^{j\pi/2}, e^{j\pi/2}$". It is assumed that the first pseudo-noise real number sequence is "−1, 0, 1, 1, −1, 1, −1, 0", then a complex-valued sequence generated by adding the first pseudo-noise real number sequence with the phase sequence bit-by-bit is "$-1+e^{j\pi/2}, -e^{j\pi/2}, 1, 1-e^{j\pi/2}, -1+e^{j\pi/2}, 1, -1-e^{j\pi/2}, e^{j\pi/2}$", and the complex-valued sequence may also be represented as "−1+j, −j, 1, 1−j, −1+j, 1, −1−j, j". This complex-valued sequence may be used as the complex-valued spreading sequence. Moreover, energy normalization may also be further performed on the complex-valued sequence, and then the obtained complex-valued sequence is further used as the complex-valued spreading sequence.

The above-mentioned phase set and the mapping relationship between the M-element pseudo-noise sequence and the phase set may be configured or predefined as another form by the system. The principles are similar to the above-mentioned principles and are thus not repeatedly described.

Embodiment Five

Figure 12:
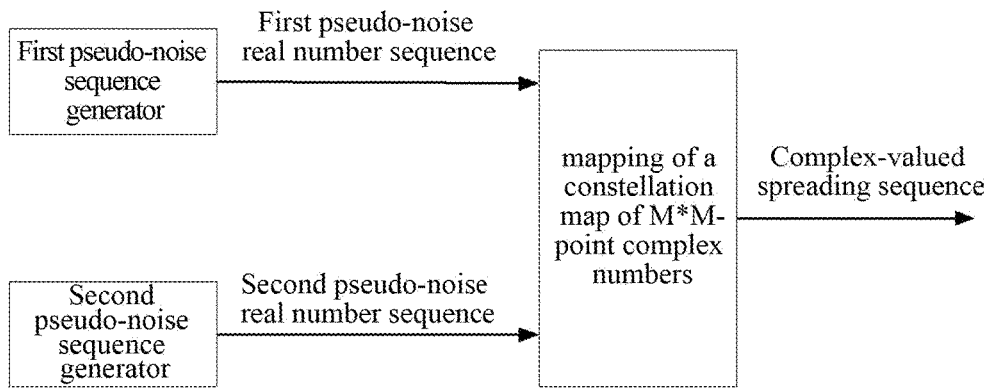
FIG. 12 is a principle schematic diagram of an example about generation of a complex-valued spreading sequence in embodiment five of the present disclosure.
Figure 13:
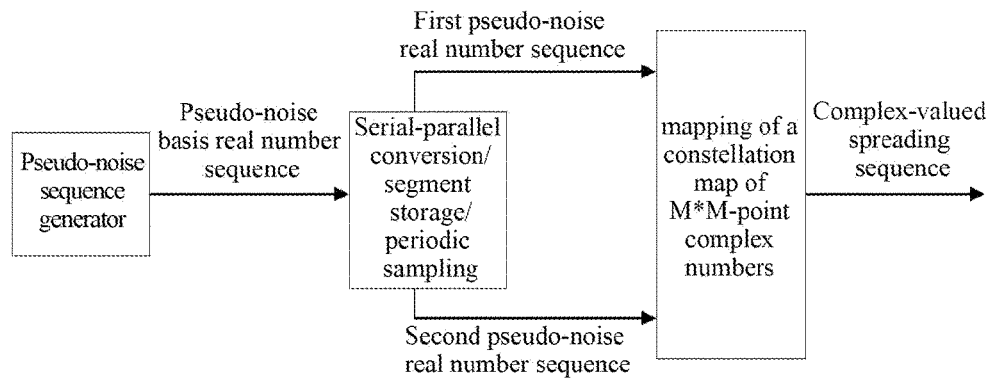
FIG. 13 is a principle schematic diagram of another example about generation of a complex-valued spreading sequence in embodiment five of the present disclosure.

The embodiment provides a method for generating a complex-valued spreading sequence. The principle of the method is shown in FIG. 12 or FIG. 13. A transmitter generates a complex-valued spreading sequence according to two pseudo-noise real number sequences, and the length of the two pseudo-noise real number sequences is the same as the length of the complex-valued spreading sequence. The generation process is described in embodiment three.

In the embodiment, as shown in FIG. 12 and FIG. 13, according to a mapping relationship between two pseudo-noise real number sequences and a complex constellation map, the pseudo-noise first and second real number sequences are together mapped into the complex constellation map bit by bit to generate a complex-valued spreading sequence, which is represented by the following equation:

$(Seq1_i, Seq2_i) \rightarrow ComplexSeq_i$

Herein, $ComplexSeq_i$, represents the i-th element of the complex-valued spreading sequence, and is obtained from $(Seq1_i, Seq2_i)$ according to the mapping relationship between the pseudo-noise real number sequence and the complex constellation map. Herein, $Seq1^i$ represents the i-th element of the first pseudo-noise real number sequence, and $Seq2_i$ represents the i-th element of the second pseudo-noise real number sequence.

Figure 14:
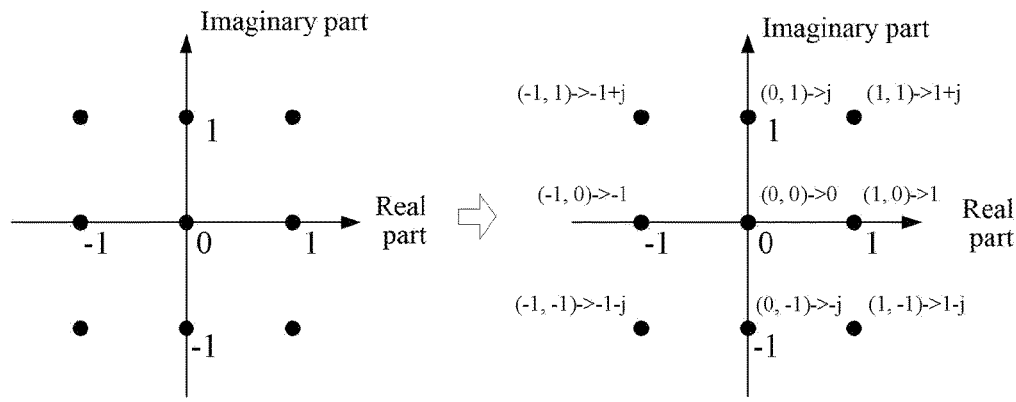
FIG. 14 is a schematic diagram of a mapping relationship between two pseudo-noise real number sequences with values selected from a three-element set of real numbers and a complex constellation map.

Taking M=3 as an example, that is, values of all elements of the pseudo-noise first and second real number sequences are from a three-element set of real numbers {1, 0, −1}. For the two pseudo-noise real number sequences, it is predefined that the complex constellation map includes 9 complex constellation points formed by 9 complex coordinates 1+j, j, −1+j, 1, 0, −1, 1−j, −j, −1−j. It is predefined that $(Seq1_i, Seq2_i)$ is mapped to the complex 1+j when value of $(Seq1_i, Seq2_i)$ is (1, 1); mapped to the complex j when value of $(Seq1_i, Seq2_i)$ is (0, 1); mapped to the complex −1+j when value of $(Seq1_i, Seq2_i)$ is (−1, 1); mapped to the complex 1 when value of $(Seq1_i, Seq2_i)$ is (1, 0); mapped to the complex 0 when value of $(Seq1_i, Seq2_i)$ is (0, 0); mapped to the complex −1 when value of $(Seq1_i, Seq2_i)$ is (−1, 0); mapped to the complex 1−j when value of $(Seq1_i, Seq2_i)$ is (1, −1); mapped to the complex −j when value of $(Seq1_i, Seq2_i)$ is (0, −1); and mapped to the complex −1−j when value of $(Seq1_i, Seq2_i)$ is (−1, −1), as shown in FIG. 14.

In the embodiment, it is assumed that the first pseudo-noise real number sequence is "−1, 0, 1, 1, −1, 1, −1, 0", and the second pseudo-noise real number sequence is "1, −1, 0, −1, 1, 0, −1, 1". According to the mapping relationship between the two pseudo-noise real number sequences and a 9-point complex constellation map, the first pseudo-noise real number sequence and the second pseudo-noise real number sequence are together mapped to the complex constellation points on the 9-point complex constellation map bit by bit to obtain a complex-valued sequence "−1+j, −j, 1, 1−j, −1+j, 1, −1−j, j". This sequence may be used as a generated complex-valued spreading sequence. Moreover, energy normalization may also be further performed on the complex-valued spreading sequence, and then the obtained complex-valued sequence is further used as the complex-valued spreading sequence. Here, during energy normalization, the employed energy normalization coefficient may also be the reciprocal of the sum of energies of 9 complex constellation points on the complex constellation map.

Figure 15:
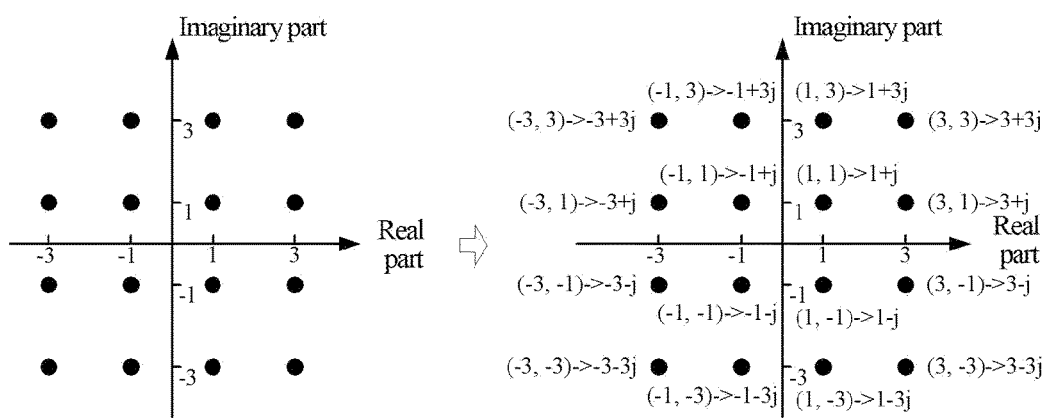
FIG. 15 is a schematic diagram of a mapping relationship between two pseudo-noise real number sequences with values selected from a four-element set of real numbers and a complex constellation map.

Taking M=4 as an example, that is, values of all elements of the pseudo-noise first and second real number sequences are from a four-element set of real numbers {3, 1, −1 and −3}. For the two pseudo-noise real number sequences, it is predefined that the complex constellation map includes 16 complex constellation points formed by 16 complex coordinates 3+3j, 3+j, 3−j, 3−3j, 1+3j, 1+j, 1−j, 1−3j, −1+3j, −1+j, −1−j, −1−3j, −3+3j, −3+j, −3−j, −3−3j. It is predefined that ($Seq1_i$, $Seq2_i$) is mapped to the complex 3+3j when the value of ($Seq1_i$, $Seq2_i$) is (3, 3); mapped to the complex 3+j when the value of ($Seq1_i$, $Seq2_i$) is (3, 1); mapped to the complex 3−j when the value of ($Seq1_i$, $Seq2_i$) is (3, −1); mapped to the complex 3−3j when the value of ($Seq1_i$, $Seq2_i$) is (3, −3); mapped to the complex 1+3j when the value of ($Seq1_i$, $Seq2_i$) is (1, 3); mapped to the complex 1+j when the value of ($Seq1_i$, $Seq2_i$) is (1, 1); mapped to the complex 1−j when the value of ($Seq1_i$, $Seq2_i$) is (1, −1); mapped to the complex 1−3j when the value of ($Seq1_i$, $Seq2_i$) is (1, −3); mapped to the complex −1+3j when the value of ($Seq1_i$, $Seq2_i$) is (−1, 3); mapped to the complex −1+j when the value of ($Seq1_i$, $Seq2_i$) is (−1, 1); mapped to the complex −1−j when the value of ($Seq1_i$, $Seq2_i$) is (−1, −1); mapped to the complex −1−3j when the value of ($Seq1_i$, $Seq2_i$) is (−1, −3); mapped to the complex −3+3j when the value of ($Seq1_i$, $Seq2_i$) is (−3, 3); mapped to the complex −3+j when the value of ($Seq1_i$, $Seq2_1$) is (−3, 1); mapped to the complex −3−j when the value of ($Seq1_i$, $Seq2_i$) is (−3, −1); and mapped to the complex −3−3j when the value of ($Seq1_i$, $Seq2_i$) is (−3, −3), as shown in FIG. 15.

In the embodiment, it is assumed that the first pseudo-noise real number sequence is "−1, 3, 1, −3, 1, 3, −1, −3", and the second pseudo-noise real number sequence is "3, 1, −3, −1, 1, −1, −3, 3". According to the mapping relationship between the two pseudo-noise real number sequences and a 16-point complex constellation map, the first pseudo-noise real number sequence and the second pseudo-noise real number sequence are together mapped to the complex constellation points on the 16-point complex constellation map bit by bit to obtain a complex-valued sequence "−1+3j, 3+j, 1−3j, −3−j, 1+j, 3−j, −1−3j, −3−3j". This sequence may be used as a generated complex-valued spreading sequence. Moreover, energy normalization may also be further performed on the complex-valued sequence, and then the obtained complex-valued sequence is further used as the complex-valued spreading sequence.

For the above-mentioned mapping relationship between the two pseudo-noise real number sequences and the 16-point complex constellation map, each set of values of elements of the two pseudo-noise real number sequences may be numbered by binary indexes. For example, (1, 1) is represented as 0000; (−1, 1) is represented as 0001; . . . ; (3, −3) is represented as 1111. Similarly, 16 complex constellation points of the 16-point complex constellation map are also numbered according to the same rule. For example, 1+j is represented as 0000; −1+j is represented as 0001; . . . ; 3−3j is represented as 1111. That is, a corresponding one-to-one relationship is formed between each set of values of elements of two four element pseudo-noise sequences and 16 complex constellation points. Then, two generated pseudo-noise real number sequences are together mapped to the complex constellation points on the 16-point complex constellation map bit by bit according to the mapping relationship to obtain a complex-valued sequence. The complex-valued sequence is used as the complex-valued spreading sequence, or the complex-valued spreading sequence is obtained after performing energy normalization on the complex-valued sequence.

In addition to the above-mentioned mapping between two pseudo-noise real number sequences and the 16-point complex constellation map when M=4, two pseudo-noise real number sequences generated when M=2 and the 16-point complex constellation map may also be used for mapping. Since the value of element of the pseudo-noise real number sequence is 0 or 1, or 1 or −1 when M=2, two elements in the real number sequence need to be used each time for participating in mapping. For example, assuming that when M=2, the first pseudo-noise real number sequence is "01100011" and the second pseudo-noise real number sequence is "10111010", two elements are sequentially taken from the first pseudo-noise real number sequence and the second pseudo-noise real number sequence simultaneously for mapping, (01, 10) is mapped to a complex constellation point represented by 0110 in the 16-point complex constellation map, and (10, 11) is mapped to a complex constellation point represented by 1011 in the 16-point complex constellation map.

The above-mentioned complex constellation map and the mapping relationship between the two pseudo-noise real number sequences and the complex constellation map may also be otherwise defined. A complex constellation map formed by more complex constellation points and a mapping relationship between more than two pseudo-noise real number sequences and the complex constellation map may also be defined. The principles are similar to the above-mentioned principles and are thus not repeatedly described.

Embodiment Six

Figure 16:
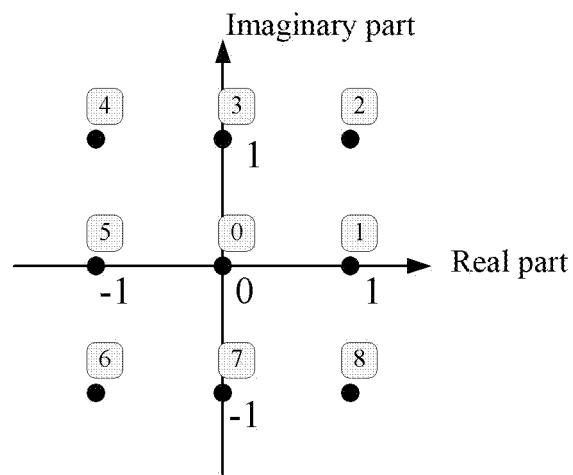
FIG. 16 is a principle schematic diagram of an example about generation of a complex-valued spreading sequence in embodiment six of the present disclosure.
Figure 17:
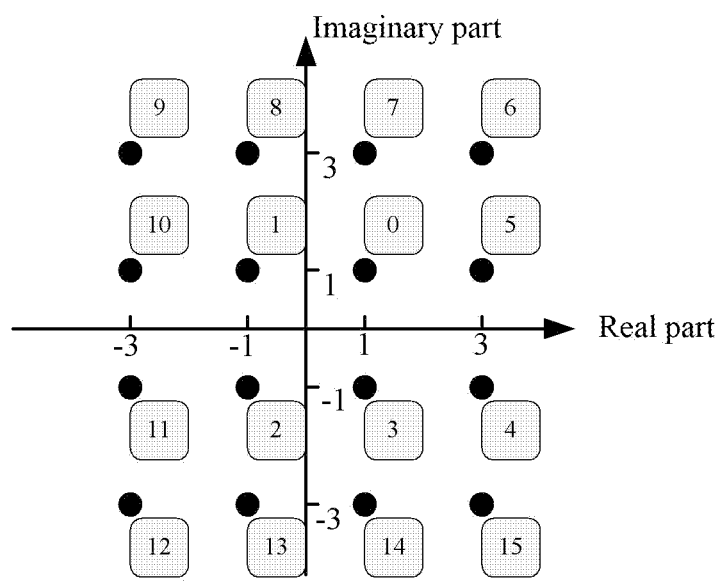
FIG. 17 is a schematic principle diagram of another example about generation of a complex-valued spreading sequence in embodiment six of the present disclosure.

The embodiment of the present disclosure provides a method for generating a complex-valued spreading sequence. The principle of the method is shown in FIG. 16 or FIG. 17.

A transmitter generates a pseudo-noise integer sequence. Herein, the integer sequence has L elements and values of all elements are from an M*M (M multiplying M)-element set of integers. The M*M-element set of integers is a set of all integers ranging from [0, M*M−1] or [1, M*M]. Herein, M and L are integers larger than or equal to 2.

Based on the L elements of the pseudo-noise integer sequence, L corresponding complex constellation points are selected from an M*M-point complex constellation map according to a preset mapping rule.

L complex numbers corresponding to the L complex constellation points are determined, and the L complex numbers are sequentially combined to obtain the complex-valued spreading sequence, or, L complex numbers, after multiplying the L complex numbers by a corresponding energy normalization coefficient, are sequentially combined to obtain the complex-valued spreading sequence.

The complex-valued spreading sequence here is the same as that of embodiment one and embodiment two. Herein, each element is a complex number and values of real and imaginary parts of all elements of the complex-valued spreading sequence are from the M-element set of real numbers.

The above-mentioned pseudo-noise integer sequence may be generated by a pseudo-noise sequence generator which may be formed by a linear feedback shift register, as described in embodiment three.

In the embodiment, taking M*M=9-element set of integers as an example, the transmitter generates a pseudo-noise integer sequence, and values of elements of the integer sequence are from a 9-element set of integers {0, 1, 2, . . . , 8}. According to the mapping relationship between the elements in the 9-element set of integers and the complex constellation points of the M*M=9 point complex constellation map (as shown in FIG. 16), the pseudo-noise integer sequence is mapped to the complex constellation points (each complex constellation point represents a complex number) of the 9-point complex constellation map bit by bit to generate a complex-valued spreading sequence, which is represented by the following equation:

$$Seq_i \rightarrow ComplexSeq_i$$

Herein, $ComplexSeq_i$ represents the i-th element of the complex-valued spreading sequence, and is obtained from $Seq_i$ mapping according to the mapping relationship between the elements in the 9-element set of integers and the complex constellation points of the 9-point complex constellation map. Herein, $Seq_i$ represents the i-th element of the pseudo-noise integer sequence.

In another embodiment, taking M*M=16-element set of integers as an example, the transmitter generates a pseudo-noise integer sequence. Values of elements of the integer sequence are from a 16-element set of integers {0, 1, 2, . . . , 15}. According to the mapping relationship between the elements in the 16-element set of integers and the complex constellation points of the M*M=16 point complex constellation map (as shown in FIG. 17), the pseudo-noise integer sequence is mapped to the complex constellation points of the 16-point complex constellation map bit by bit to generate a complex-valued spreading sequence, which is represented by the following equation:

$$Seq_i \rightarrow ComplexSeq_i$$

Herein, $ComplexSeq_i$ represents the i-th value of the complex-valued spreading sequence, and is obtained from $Seq_i$ mapping according to the mapping relationship between the elements in the 16-element set of integers and the complex constellation points of the 16-point complex constellation map. Herein, $Seq_i$ represents the i-th element of the pseudo-noise integer sequence.

The above-mentioned M*M-element set of integers, the M*M-point complex constellation map and the mapping relationship therebetween may also be otherwise defined. The principles are similar to the above-mentioned principles and are thus not repeatedly described.

Embodiment Seven

The embodiment provides a method for determining a complex-valued spreading sequence as follows.

A transceiving system predefines a complex-valued sequence set (which may be represented in the form of a complex-valued sequence table). Herein, each element of the complex-valued sequence of the complex-valued sequence set is a complex number, and values of real and imaginary parts of all elements of the complex-valued sequence are from an M-element set of real numbers. The M-element set of real numbers may employ the M-element set of real numbers used in embodiment one and embodiment two, and thus is not repeatedly described.

When determining the complex-valued spreading sequence, the transmitter selects a complex-valued sequence from a preset complex-valued sequence set of a transceiving system according to an appointed rule, and determines the complex-valued sequence as the complex-valued spreading sequence; or selects a complex-valued sequence from a preset complex-valued sequence set of a transceiving system according to complex-valued sequence index information sent by a base station, and determines the complex-valued sequence as the complex-valued spreading sequence.

For example, a terminal transmitter obtains a complex-valued sequence from the complex-valued sequence set as the complex-valued spreading sequence according to a randomly generated index or according to an index calculated through a predefined equation, or, the base station notifies the terminal transmitter of an index of the complex-valued spreading sequence through signaling, and the terminal transmitter obtains the complex-valued sequence from the complex-valued sequence set or the complex-valued sequence table as the complex-valued spreading sequence according to the index.

In the embodiment, it is assumed that Table 1 is a complex-valued sequence set predefined by the system, and the complex-valued sequence set includes n complex-valued sequences, and each sequence has a length of L.

TABLE 1

| Index | 0 | 1 | . . . | L-1 |
|---|---|---|---|---|
| 0 | 1 + j | 0 | . . . | −1 − j |
| 1 | −j | 1 | . . . | −1 + j |
| . . . | . . . | . . . | . . . | . . . |
| n − 1 | 1 − j | −1 + j | . . . | 0 |

The above-mentioned complex-valued sequence set or complex-valued sequence table may also be otherwise defined. The principles are similar to the above-mentioned principles and are thus not repeatedly described.

According to a randomly generated index ranging from 0 to n−1, for example, the generated index is 1, the terminal transmitter selects a complex-valued sequence having an index of 1 from Table 1 as the complex-valued spreading sequence thereof; or, according to an index calculated through a preset equation, for example, the calculated index is 1, the terminal transmitter selects a complex-valued sequence having an index of 1 from Table 1 as the complex-valued spreading sequence thereof.

In another embodiment, the base station notifies the terminal transmitter of the index of the complex-valued spreading sequence through signaling, for example, the index notified by the base station through signaling is 1, and the terminal transmitter selects a complex-valued sequence having an index of 1 from Table 1 as the complex-valued spreading sequence thereof according to the index.

In addition, when selecting the complex-valued sequence from Table 1 according to an index, the terminal may also select a complex-valued sequence having a length of C as the complex-valued spreading sequence thereof. Herein, $C \leq L$. The length C of the complex-valued sequence may be determined by the terminal transmitter or notified to the terminal by the base station through signaling.

One skilled in the art can understand that all or partial steps of the above-mentioned embodiments can be implemented by using a computer program flow. The computer program can be stored in a computer readable storage medium. The computer program is executed on corresponding hardware platforms (such as systems, equipment, apparatuses and devices and so on), and during execution, one or a combination of the steps of the method embodiments is included.

In an exemplary embodiment, all or partial steps of the above-mentioned embodiments may also be implemented by using integrated circuits, and these steps may be respectively fabricated into integrated circuit modules, or multiple modules or steps thereof may be fabricated into a single integrated circuit module for implementation. Therefore, the present disclosure is not limited to any specific combination of hardware and software.

Various apparatus/function modules/function units in the above-mentioned embodiments may also be implemented by adopting general computing devices, and may be integrated on a single computing device and may also be distributed in a network consisting of multiple computing devices.

When various apparatus/function modules/function units in the above-mentioned embodiments are implemented in the form of software function module and are sold or used as an independent product, various apparatus/function modules/function units may be stored in a computer readable storage medium. The above-mentioned computer readable storage medium may be a read only memory, a magnetic disk, a compact disk or the like.

Any one skilled in the art can easily conceive variation or replacement within the technical scope disclosed by the present disclosure, but the variation or replacement shall also be included in the protection scope of the present disclosure. Therefore, the protection scope of the present disclosure shall be subjected to the protection scope of claims.

INDUSTRIAL APPLICABILITY

According to the multi-user code division multiple access communication method, and corresponding transmitter and receiver provided by the embodiments of the present disclosure, by using a complex-valued spreading sequence to perform spreading on data symbols, a set of sequences having low cross-correlation is easily selected in comparison with a binary real number sequence, which can obtain a better code division multiple access performance, improve the system's overload capacity and improve the user's communication experience of non-orthogonal overload access.

What we claimed is:

1. A multi-user code division multiple access communication method, applied to a transmitter, comprising:
   the transmitter determining a complex-valued spreading sequence to be used, wherein, each element of the complex-valued spreading sequence is a complex number, and values of real and imaginary parts of all elements in the complex-valued spreading sequence are from an M-element set of real numbers, wherein, M is an integer larger than or equal to 2;
   the transmitter performing spreading processing on data symbols to be sent by using the complex-valued spreading sequence, to generate a spread symbol sequence; and
   the transmitter sending the spread symbol sequence; wherein,
   the M is an odd number and the M-element set of real numbers is a set of M integers ranging from $[-(M-1)/2, (M-1)/2]$; or
   the M is an even number and the M-element set of real numbers is a set of M odd numbers ranging from $[-(M-1), (M-1)]$; or
   the M is an odd number and the M-element set of real numbers is a set of M real numbers obtained by respectively multiplying M integers ranging from $[-(M-1)/2, (M-1)/2]$ by a corresponding energy normalization coefficient; or
   the M is an even number and the M-element set of real numbers is a set of M real numbers obtained by respectively multiplying M odd numbers ranging from $[-(M-1), (M-1)]$ by a corresponding energy normalization coefficient.

2. The method of claim 1, wherein:
   M=2, 3 or 4.

3. The method of claim 1, wherein:
   said determining a complex-valued spreading sequence to be used comprises:
   generating pseudo-noise first and second real number sequences, wherein values of all elements of the first and second real number sequences are from the M-element set of real numbers, and the number of elements contained in the first real number sequence and the number of elements contained in the second real number sequence are equal to L which is the number of the elements of the complex-valued spreading sequence;
   taking an i-th element of the first real number sequence as a real part, taking an i-th element of the second real number sequence as an imaginary part, and taking a complex number comprising the real part and the imaginary part as an i-th element of the complex-valued spreading sequence, wherein, i=1, 2, . . . , L, and L is an integer larger than or equal to 2;
   sequentially combining obtained L elements to obtain the complex-valued spreading sequence, or, sequentially combining L elements after multiplying the obtained L elements by a corresponding energy normalization coefficient to obtain the complex-valued spreading sequence.

4. The method of claim 1, wherein:
   said determining a complex-valued spreading sequence to be used comprises:
   selecting, according to an appointed rule, a complex-valued sequence from a complex-valued sequence set preset by a transceiving system and determining the complex-valued sequence as the complex-valued spreading sequence; or
   selecting, according to complex-valued sequence index information sent by a base station, a complex-valued sequence from a complex-valued sequence set preset by a transceiving system and determining the complex-valued sequence as the complex-valued spreading sequence;
   wherein, in each complex-valued sequence in the complex-valued sequence set, values of real and imaginary parts of all elements are from the M-element set of real numbers.

5. The method of claim 1, wherein:
   said determining a complex-valued spreading sequence to be used comprises:
   generating a pseudo-noise integer sequence, wherein the integer sequence has L elements and values of all elements of the integer sequence are from an M*M-element set of integers, and the M*M-element set of integers is a set of all integers ranging from [0, M*M−1] or [1, M*M], and L is an integer larger than or equal to 2;
   selecting, based on the L elements of the pseudo-noise integer sequence, L corresponding complex constellation points from an M*M-point complex constellation map according to a preset mapping rule; and
   determining L complex numbers corresponding to the L complex constellation points, sequentially combining the L complex numbers to obtain the complex-valued spreading sequence, or, sequentially combining L complex numbers after multiplying the L complex numbers by a corresponding energy normalization coefficient to obtain the complex-valued spreading sequence.

6. The method of claim 1, wherein:
   said sending the spread symbol sequence comprises:
   performing multi-carrier modulation for the spread symbol sequence, generating transmission signals and transmitting the transmission signals.

7. A multi-user code division multiple access communication method, applied to a receiver, comprising:

the receiver receiving signals transmitted by a plurality of transmitters, wherein, the signals transmitted by the plurality of transmitters are generated by the plurality of transmitters using respective complex-valued spreading sequences respectively to perform spreading processing on respective data symbols to be sent and then respectively modulating generated spread symbol sequences onto the same time-frequency resources;

the receiver performing reception detection on the received signals transmitted by the plurality of transmitters by using an interference cancellation signal detector, wherein the complex-valued spreading sequences used by the plurality of transmitters are used during detection;

wherein, each element of the complex-valued spreading sequences is a complex number and values of real and imaginary parts of all elements in the complex-valued spreading sequences are from an M-element set of real numbers, wherein, M is an integer larger than or equal to 2; wherein:

the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding normalization coefficient; or the M is an even number and the M-element set of real numbers is a set of M real numbers obtained by respectively multiplying M odd numbers ranging from $[-(M-1), (M-1)]$ by a corresponding normalization coefficient.

8. The method of claim 7, wherein:
M=2, 3 or 4.

9. A transmitter in a multi-user code division multiple access communication system, comprising hardware performing instructions stored in a non-transitory computer readable medium which executes steps in following units:

a sequence determining unit configured to determine a complex-valued spreading sequence to be used, wherein, each element of the complex-valued spreading sequence is a complex number, and values of real and imaginary parts of all elements in the complex-valued spreading sequence are from an M-element set of real numbers, wherein, M is an integer larger than or equal to 2;

a spreading unit configured to perform spreading processing on data symbols to be sent by using the complex-valued spreading sequence to generate a spread symbol sequence; and a signal sending unit configured to send the spread symbol sequence; wherein:

the values of real and imaginary parts of all elements in the complex-valued spreading sequence determined by the sequence determining unit are from an M-element set of real numbers, wherein:

the M is an odd number and the M-element set of real numbers is a set of M integers ranging from $[-(M-1)/2, (M-1)/2]$; or the M is an even number and the M-element set of real numbers is a set of M odd numbers ranging from $[-(M-1), (M-1)]$; or the M is an odd number and the M-element set of real numbers is a set of M real numbers obtained by respectively multiplying M integers ranging from $[-(M-1)/2, (M-1)/2]$ by a corresponding normalization coefficient; or the M is an even number and the M-element set of real numbers is a set of M real numbers obtained by respectively multiplying M odd numbers ranging from $[-(M-1), (M-1)]$ by a corresponding normalization coefficient.

10. The transmitter of claim 9, wherein:
the values of real and imaginary parts of all elements in the complex-valued spreading sequence determined by the sequence determining unit are from an M-element set of real numbers, wherein M=2, 3 or 4.

11. The transmitter of claim 9, wherein:
the operation that the sequence determining unit determines a complex-valued spreading sequence to be used comprises:

generating pseudo-noise first and second real number sequences, wherein values of all elements of the first and second real number sequences are from the M-element set of real numbers, and the number of elements contained in the first real number sequence and the number of elements contained in the second real number sequence are equal to L which is the number of the elements of the complex-valued spreading sequence;

taking an i-th element of the first real number sequence as a real part, taking an i-th element of the second real number sequence as an imaginary part, and taking a complex number comprising the real part and the imaginary part as an i-th element of the complex-valued spreading sequence, wherein, i=1, 2, . . . , L, and L is an integer larger than or equal to 2;

sequentially combining obtained L elements to obtain the complex-valued spreading sequence, or, sequentially combining L elements after multiplying the obtained L elements by a corresponding energy normalization coefficient to obtain the complex-valued spreading sequence;

or, the operation that the sequence determining unit determines a complex-valued spreading sequence to be used comprises:

selecting, according to an appointed rule, a complex-valued sequence from a complex-valued sequence set preset by a transceiving system and determining the complex-valued sequence as the complex-valued spreading sequence; or selecting, according to complex-valued sequence index information sent by a base station, a complex-valued sequence from a complex-valued sequence set preset by a transceiving system and determining the complex-valued sequence as the complex-valued spreading sequence;

wherein, in each complex-valued sequence in the complex-valued sequence set, values of real and imaginary parts of all elements are from the M-element set of real numbers;

or, the operation that the sequence determining unit determines a complex-valued spreading sequence to be used comprises:

generating a pseudo-noise integer sequence, wherein the integer sequence has L elements and values of all elements of the integer sequence are from an M*M-element set of integers, and the M*M-element set of integers is a set of all integers ranging from [0, M*M−1] or [1, M*M], and L is an integer larger than or equal to 2;

selecting, based on the L elements of the pseudo-noise integer sequence, L corresponding complex constellation points from an M*M-point complex constellation map according to a preset mapping rule; and determining L complex numbers corresponding to the L complex constellation points, sequentially combining the L complex numbers to obtain the complex-valued spreading sequence, or, sequentially combining L complex numbers after multiplying the L complex numbers by a corresponding energy normalization coefficient to obtain the complex-valued spreading sequence.

12. The transmitter of claim 9, wherein:

the operation that the signal sending unit sends the spread symbol sequence comprises: performing multi-carrier modulation for the spread symbol sequence, generating transmission signals and transmitting the transmission signals.

13. A receiver in a multi-user code division multiple access communication system, comprising hardware performing instructions stored in a non-transitory computer readable medium which executes steps in following units:

a signal receiving unit configured to receive signals transmitted by a plurality of transmitters, wherein the signals transmitted by the plurality of transmitters are generated by the plurality of transmitters using respective complex-valued spreading sequences respectively to perform spreading processing on respective data symbols to be sent and then respectively modulating generated spread symbol sequences onto the same time-frequency resources;

a reception detecting unit configured to perform reception detection on the received signals transmitted by the plurality of transmitters by using an interference cancellation signal detector, wherein the complex-valued spreading sequences used by the plurality of transmitters are used during detection;

wherein, each element of the complex-valued spreading sequences is a complex number and values of real and imaginary parts of all elements in the complex-valued spreading sequences are from an M-element set of real numbers, wherein, M is an integer larger than or equal to 2; wherein:

in the complex-valued spreading sequences, used by the plurality of transmitters, which are used during detection by the reception detecting unit, the values of real and imaginary parts of all elements are from an M-element set of real numbers, wherein:

the M is an odd number and the M-element set of real numbers is a set of M integers ranging from [−(M−1)/2, (M−1)/2]; or the M is an even number and the M-element set of real numbers is a set of M odd numbers ranging from [−(M−1), (M−1)]; or the M is an odd number and the M-element set of real numbers is a set of M real numbers obtained by respectively multiplying M integers ranging from [−(M−1)/2, (M−1)/2] by a corresponding normalization coefficient; or the M is an even number and the M-element set of real numbers is a set of M real numbers obtained by respectively multiplying M odd numbers ranging from [−(M−1), (M−1)] by a corresponding normalization coefficient.

14. The transmitter of claim 13, wherein:

in the complex-valued spreading sequences, used by the plurality of transmitters, which are used during detection by the reception detecting unit, the values of real and imaginary parts of all elements are from an M-element set of real numbers, wherein M=2, 3 or 4.

15. A non-transitory computer-readable storage medium in which computer programs are stored, wherein, the computer programs comprises program instructions, when the computer programs are executed by a transmitter device, the transmitter device can perform the method of claim 1.

16. A non-transitory computer-readable storage medium in which computer programs are stored, wherein, the computer programs comprises program instructions, when the computer programs are executed by a receiver device, the receiver device can perform the method of claim 7.

* * * * *